US009772837B2

(12) United States Patent
Kalidindi et al.

(10) Patent No.: US 9,772,837 B2
(45) Date of Patent: Sep. 26, 2017

(54) DYNAMIC DELIVERY OF CODE AND FIXES

(71) Applicant: Verizon Patent and Licensing Inc., Arlington, VA (US)

(72) Inventors: Srirama R. Kalidindi, Flower Mound, TX (US); Anjaneya Pericharla, Irving, TX (US); Sanjay Ahuja, Irving, TX (US); Jaykishan Tiwari, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 76 days.

(21) Appl. No.: 14/753,237

(22) Filed: Jun. 29, 2015

(65) Prior Publication Data

US 2016/0378453 A1  Dec. 29, 2016

(51) Int. Cl.
*G06F 9/45* (2006.01)
*G06F 9/445* (2006.01)
*G06F 11/36* (2006.01)

(52) U.S. Cl.
CPC .............. *G06F 8/65* (2013.01); *G06F 8/61* (2013.01); *G06F 11/3688* (2013.01)

(58) Field of Classification Search
CPC . G06F 8/65–8/68; G06F 8/61; G06F 11/3688; G06F 21/51
See application file for complete search history.

(56) References Cited

U.S. PATENT DOCUMENTS

| 5,742,829 A * | 4/1998 | Davis ...................... G06F 8/61 717/178 |
| 7,047,448 B2 * | 5/2006 | Rao ..................... G06F 11/1433 714/38.14 |
| 8,347,263 B1 * | 1/2013 | Offer ........................ G06F 8/71 717/104 |
| 2002/0174422 A1 * | 11/2002 | Kelley ...................... G06F 8/65 717/178 |
| 2003/0182414 A1 * | 9/2003 | O'Neill ..................... G06F 8/65 709/223 |

(Continued)

OTHER PUBLICATIONS

Michael B. Giles et al., "Progress in adjoint error correction for integral functionals", [Online], 2004, pp. 113-121, [Retrieved from Internet on Apr. 13, 2017], <https://people.maths.ox.ac.uk/gilesm/files/cvs04.pdf>.*

(Continued)

*Primary Examiner* — Ziaul A Chowdhury

(57) ABSTRACT

A network device distributes, to multiple user devices, a client application that includes multiple modular code segment files and obtains updated code segment files and dependency information for the client application, the dependency information associating known defects in the client application with one or more of the updated code segment files. The network device receives an error report from one of the multiple user devices, the error report including a particular defect identifier, and determines, based on the dependency information, that an updated code segment file is available to correct an error indicated by the particular defect identifier. The network device retrieves, from a code segment storage location, the updated code segment file and sends the updated code segment file to the one of the multiple user devices.

20 Claims, 8 Drawing Sheets

(56) References Cited

U.S. PATENT DOCUMENTS

| | | | | |
|---|---|---|---|---|
| 2004/0103412 | A1* | 5/2004 | Rao | G06F 11/1433 717/171 |
| 2005/0060564 | A1* | 3/2005 | Murakami | G06F 21/51 726/26 |
| 2009/0082051 | A1* | 3/2009 | Ruotsi | G06Q 10/10 455/519 |
| 2009/0228878 | A1* | 9/2009 | Katsaros | G06F 8/68 717/172 |
| 2009/0313506 | A1* | 12/2009 | Elizarov | G06F 11/3688 714/37 |
| 2011/0225575 | A1* | 9/2011 | Ningombam | G06F 8/65 717/170 |
| 2012/0089973 | A1* | 4/2012 | Bhat | G06F 8/68 717/169 |
| 2013/0246849 | A1* | 9/2013 | Plamondon | G06F 11/3688 714/27 |
| 2014/0033176 | A1* | 1/2014 | Rama | G06F 11/3688 717/124 |
| 2014/0195662 | A1* | 7/2014 | Pulipakkam | G06F 8/65 709/223 |
| 2014/0304699 | A1* | 10/2014 | He | H04W 8/245 717/171 |
| 2015/0113517 | A1* | 4/2015 | Bennah | G06F 8/65 717/170 |
| 2015/0347122 | A1* | 12/2015 | Wang | G06F 8/65 717/172 |
| 2015/0379262 | A1* | 12/2015 | Islam | G06F 21/51 726/22 |
| 2016/0019042 | A1* | 1/2016 | Eberlein | G06F 8/65 717/168 |

OTHER PUBLICATIONS

Ryan Gabrys et al., "Graded Bit-Error-Correcting Codes With Applications to Flash Memory", [Online], 2013, pp. 2315-2327, [Retrieved from Interent on Apr. 13, 2017], <http://citeseerx.ist.psu.edu/viewdoc/download?doi=10.1.1.415.1391&rep=rep1&type=pdf>.*

Mr.Bipin Shinde et al., "An Effective Estimation of Software Defect", [Online], 2014, pp. 1-5, [Retrieved from Internet on Apr. 13, 2017], <http://s3.amazonaws.com/academia.edu.documents/33019172/3.pdf>.*

Raghvendra Omprakash Singh et al., "An Effectual Estimation of Software Defect (EESD)", [Online], 2014, pp. 1122-1126, [Retrieved from Internet on Apr. 13, 2017], <http://ijarcet.org/wp-content/uploads/IJARCET-VOL-3-ISSUE-4-1122-1126.pdf>.*

* cited by examiner

| DEFECT # | DEFECT MARKER # | DEPENDENCIES |
|---|---|---|
| 100 | DEFECT MARKER 1 | FUNCTION 1 AND 2 FROM CODE FILE #1 |
| 101 | DEFECT MARKER 2 | FUNCTION 3 AND 4 FROM CODE FILE #1 |
| 102 | DEFECT MARKER 3 | FUNCTION 6 AND 7 FROM CODE FILE #1 |
| 103 | DEFECT MARKER 4 | FUNCTION 7 AND 8 FROM CODE FILE #2; FUNCTION 11 AND 12 FROM CODE FILE #3 |

FIG. 4

| DEFECT # | SEGMENT DOWNLOAD | INCIDENT COUNT | INCIDENT THRESHOLD |
|---|---|---|---|
| 100 | FUNCTION 1 AND 2 FROM CODE FILE #1 | 565 | 128,105 |
| 101 | FUNCTION 3 AND 4 FROM CODE FILE #1 | 5,299 | 5,300 |
| 102 | FUNCTION 6 AND 7 FROM CODE FILE #1 | 89,233 | 128,105 |
| 103 | FUNCTION 7 AND 8 FROM CODE FILE #2; FUNCTION 11 AND 12 FROM CODE FILE #3 | 4,512 | 62,553 |

FIG. 5

DYNAMIC DELIVERY OF CODE AND FIXES

BACKGROUND

Software upgrades for client applications residing on customer devices are often provided by pushing upgraded code to the customer devices whenever there is a new software release/upgrade available for a segment of customer devices. Such methods typically employ various protocols to download code that is hosted on code download servers and provided to that segment of customer devices.

BRIEF DESCRIPTION OF THE DRAWINGS

FIG. 4 is a sample data structure for a dependencies matrix according to an implementation described herein;

FIG. 5 is a sample data structure for an incident log according to an implementation described herein;

DETAILED DESCRIPTION OF PREFERRED EMBODIMENTS

Figure 1:
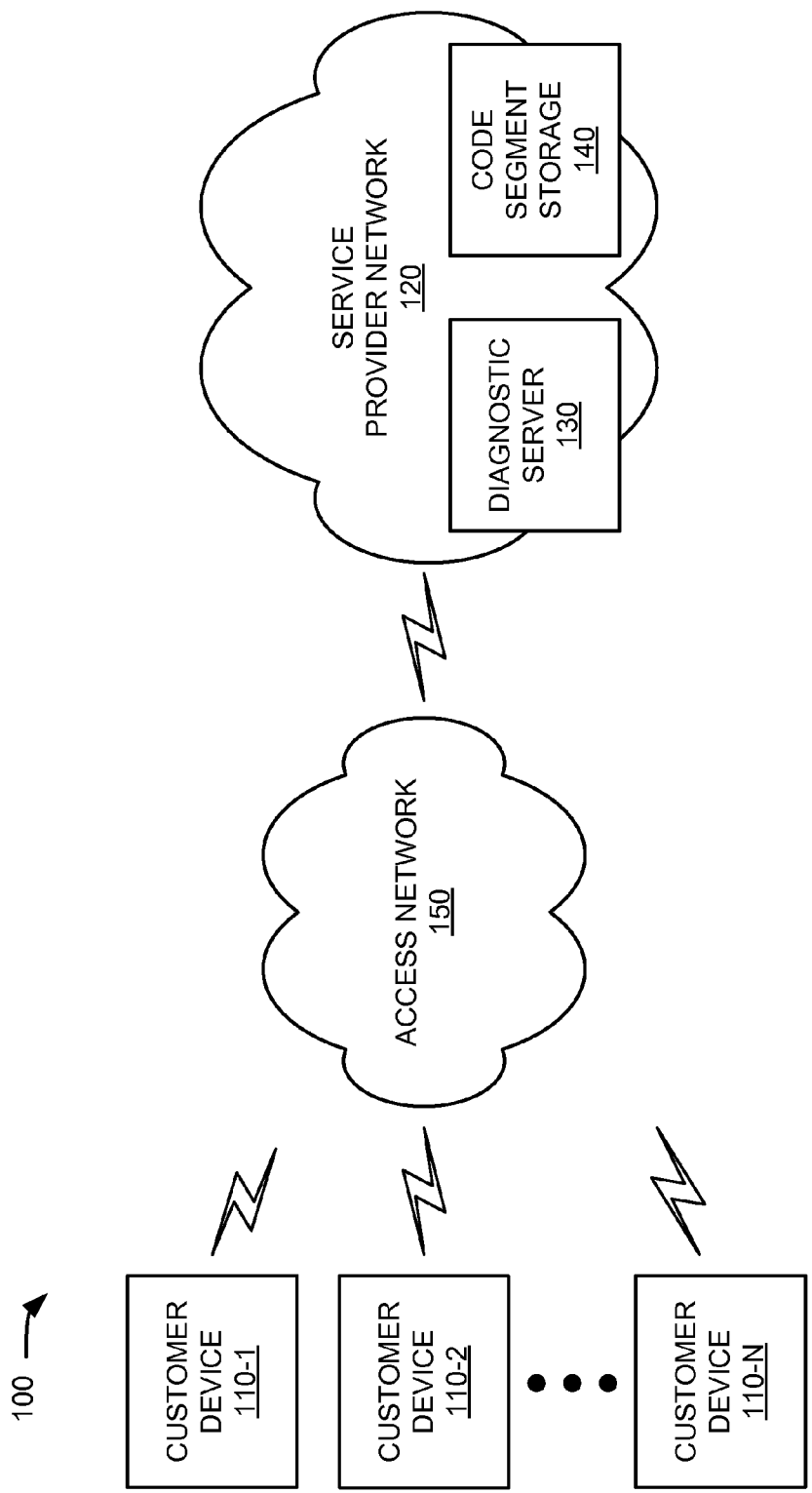
FIG. 1 is a diagram illustrating an exemplary network in which systems and/or methods described herein may be implemented.

The following detailed description refers to the accompanying drawings. The same reference numbers in different drawings may identify the same or similar elements.

Systems and methods provided herein may enable dynamic delivery of code and defect fixes to client applications on customer devices. The fixes may be targeted to particular devices/customers based on, for example, context, types of customer and usage behaviors, and types of issues/error codes.

A typical code delivery and software upgrade mechanism for customer devices, such as set-top boxes (STBs), consumer electronics (CE) devices, and mobile devices, is to push the code to the customer devices whenever there is a new software release/upgrade available for a target segment of customer devices. Standard code downloading protocols such as over-the-air (OTA) protocols, hyper-text transfer protocol (HTTP), and/or multicast protocols are used to download code that is packaged and hosted on code download servers. The typical upgrade process can involve different approaches depending, for example, on particular time frames. Fixes for longer cycles (e.g., 2-6 months) might involve deployment of code, with new features and bug fixes, which goes through extensive testing and approvals before being distributed in phases to a region or video hub office (VHO). Fixes for shorter cycles (e.g., days or weeks) might involve addressing immediate bug fixes, which are then tested and rolled out to one or more regions or VHOs. Both of these approaches require comparatively long waits for customer to get a fix, and the fixes are often also received by devices that were immune to the issue addressed by the fix. These approaches can also require larger rollouts requiring participation of multiple teams, which increases the cost of the fix.

In contrast, if a limited number of customers are facing an issue it would be much more cost effective and involve less risk to target just the affected customers with a targeted patch. Thus, according to implementations described herein, an application code is segmented in to multiple logical files and/or objects. Each logical segment is flagged with a defect marker to create an index.

According to an implementation described herein, a network device may distribute, to multiple user devices, a client application that includes multiple modular code segment files and may obtain updated code segment files and dependency information for the client application, the dependency information associating known defects in the client application with one or more of the updated code segment files. The network device may receive an error report from one of the multiple user devices, the error report including a particular defect identifier, and may determine, based on the dependency information, that an updated code segment file is available to correct an error indicated by the particular defect identifier. The network device may retrieve, from a code segment storage location, the updated code segment file and may send the updated code segment file to the one of the multiple user devices. According to another implementation described herein, the network device may log the particular defect identifier to update an incident count for the particular defect identifier; may compare the incident count to an incident threshold for the particular defect identifier; and may send, to the multiple user devices, the updated code segment file when the incident count exceeds the incident threshold for the particular defect identifier.

FIG. 1 is a diagram illustrating an exemplary network environment 100 in which systems and/or methods described herein may be implemented. As illustrated, network environment 100 may include customer devices 110-1 through 110-N (collectively "customer devices 110" and generically "customer device 110"), a service provider network 120 including an application server 130 and code segment storage 140, and an access network 150. Components of network environment 100 may be connected via wired and/or wireless links.

Customer device 110 may include a computational or communication device. Customer device 110 may enable a user to send/receive messages, view data/content, and interact with other devices. For example, customer device 110 may include an STB, a personal computer (e.g., a laptop or desktop PC), a tablet computer, a smart phone, or other types of computational or communication devices that can communicate with devices in network environment 100. In one implementation, customer device 110 may include a video streaming application or another application configured to access data and services from devices in service provider network 120 via access network 150. Additionally, customer device 110 may be configured to detect error codes generated by the video streaming application and cross-reference the error codes with defect numbers as described further herein.

Service provider network 120 may include one or more wired, wireless and/or optical networks that are capable of receiving and transmitting data, voice and/or video signals, including multi-media signals that may include voice, data and video information (generally referred to herein as "services"). Service provider network 120 may include a wide area network (WAN), a metropolitan area network (MAN), an ad hoc network, an intranet, a satellite based network, a fiber optic-based network, and/or a combination of these or other types of networks. Service provider network 120 may include an IP network or a multiprotocol label switching (MPLS) network implementing an Interior Gateway Protocol (IGP) or another protocol that implements a minimum cost end-to-end path for routing between nodes. Service provider network 120 may provide one or more interfaces to connect to client devices (e.g., customer device 110 or other devices residing on customer network 220). Service provider network 120 may be protected/separated from other networks, such as access network 150, by a firewall. Although shown as a single element in FIG. 1, service provider network 120 may include a number of separate networks.

Application server 130 may include a network device or server device to provide a backend support system for client applications residing on customer device 110. For example, application server 130 may permit customer device 110 to download a client application and/or individual code segments of that client application. As an example, the client application may enable presentation of streaming media on customer device 110. In one implementation, application server 130 may also provide software upgrades or code fixes for client applications residing on customer device 110. In another implementation, application server 130 may provide a dependencies matrix that associates known defects in the client application with updated code segment files that provide a fix for the known defect.

Code segment storage 140 may include one or more memory devices or network devices that gather, process, store and/or provide information described herein. For example, code segment storage 140 may include a database or another data structure to store code segment files for client applications.

Access network 150 may include a video signaling and distribution network and system that permits transfer of data between customer device 110 and service provider network 120. Additionally, access network 240 may include, among other things, a firewall, a filtering mechanism, a proxy, and/or network address translation mechanisms. Access network 240 may include, for example, a single network, such as a wide area network (WAN), a local area network (LAN), a metropolitan area network (MAN), a telephone network (e.g., a public switched telephone network (PSTN) or a wireless network), the Internet, a satellite network, etc., or a combination of networks. Additionally, or alternatively, access network 150 may include a cellular network, a Public Land Mobile Network (PLMN), and/or another mobile network. Access network 240 may provide customers with multimedia content provided, for example, by devices in service provider network 120. Although shown as a single element in FIG. 1, access network 150 may include a number of separate networks that function to provide services to devices in home network 210.

In FIG. 1, the particular arrangement and number of components of network environment 100 are illustrated for simplicity. In practice, there may be more customer devices 110, service provider networks 120, application servers 130, code segment storage 140, and access networks 150. For example, there may be thousands of customer devices 110.

Figure 2:
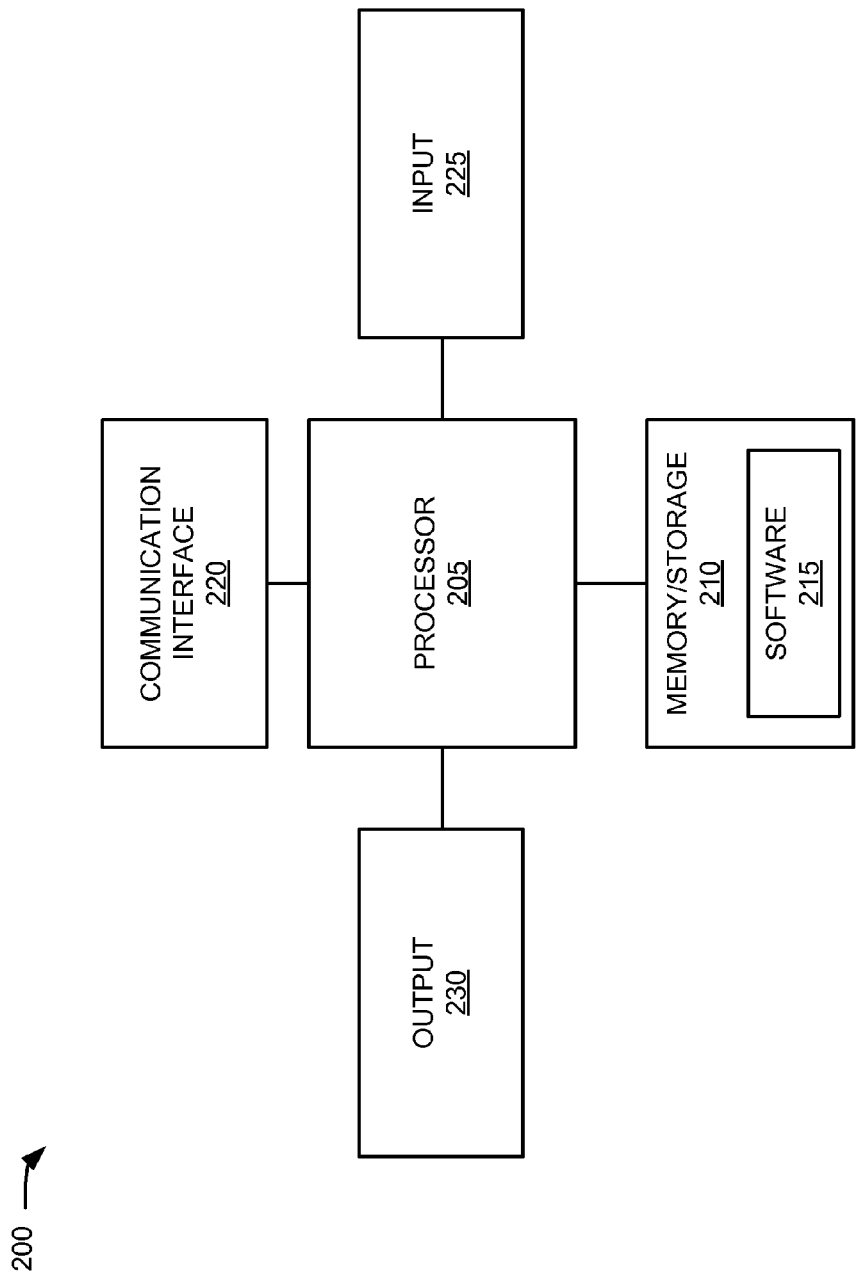
FIG. 2 is a block diagram illustrating exemplary components of a device that may correspond to one of the devices of FIG. 1.

FIG. 2 is a diagram illustrating exemplary components of a device 200 that may correspond to one or more of the devices in the environments described herein. For example, device 200 may correspond to customer device 110 or application server 130. As illustrated, according to an implementation, device 200 includes a processor 205, memory/storage 210 that stores software 215, a communication interface 220, an input 225, and an output 230. According to other implementations, device 200 may include fewer components, additional components, different components, and/or a different arrangement of components than those illustrated in FIG. 2 and described herein.

Processor 205 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.), a combination of hardware and software (e.g., a SoC, an ASIC, etc.), may include one or multiple memories (e.g., cache, etc.), etc.

Processor 205 may control the overall operation or a portion of operation(s) performed by device 200. Processor 205 may perform one or multiple operations based on an operating system and/or various applications or programs (e.g., software 215). Processor 205 may access instructions from memory/storage 210, from other components of device 200, and/or from a source external to device 200 (e.g., a network, another device, etc.).

Memory/storage 210 includes one or multiple memories and/or one or multiple other types of storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 210 may include drives for reading from and writing to the storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 210 may store data, software, and/or instructions related to the operation of device 200.

Software 215 includes an application or a computer program that provides a function and/or a process. Software 215 may include firmware. For example, with reference to application server 130, software 215 may include an application that, when executed by processor 205, provides dynamic delivery of software code and fixes, as described herein.

Communication interface 220 permits device 200 to communicate with other devices, networks, systems, etc. Communication interface 220 may include one or multiple wireless interfaces and/or wired interfaces. Communication interface 220 may include one or multiple transmitters and receivers or transceivers. Communication interface 220 may include one or multiple antennas. Communication interface 220 may operate according to a protocol, layers (e.g., radio resource control (RRC), packet data convergence control (PDCP), non-access stratum (NAS), etc.) and a communication standard (e.g., Long-term Evolution (LTE), etc.).

Input 225 permits an input into device 200. For example, input 225 may include a keyboard, a mouse, a display, a touchscreen, a touchless screen, a button, a switch, an input port, speech recognition logic, and/or some other type of visual, auditory, tactile, etc., input component. Output 230 permits an output from device 200. For example, output 230 may include a speaker, a display, a touchscreen, a touchless screen, a light, an output port, and/or some other type of visual, auditory, tactile, etc., output component.

Device 200 may perform a process and/or a function, as described herein, in response to processor 205 executing software 215 stored by memory/storage 210. By way of example, instructions may be read into memory/storage 210 from another memory/storage 210 (not shown) or read from another device (not shown) via communication interface 220. The instructions stored by memory/storage 210 may cause processor 205 to perform a process described herein. Alternatively, for example, according to other implementations, device 200 may perform a process described herein based on the operation of hardware (processor 205, etc.).

Figure 3:
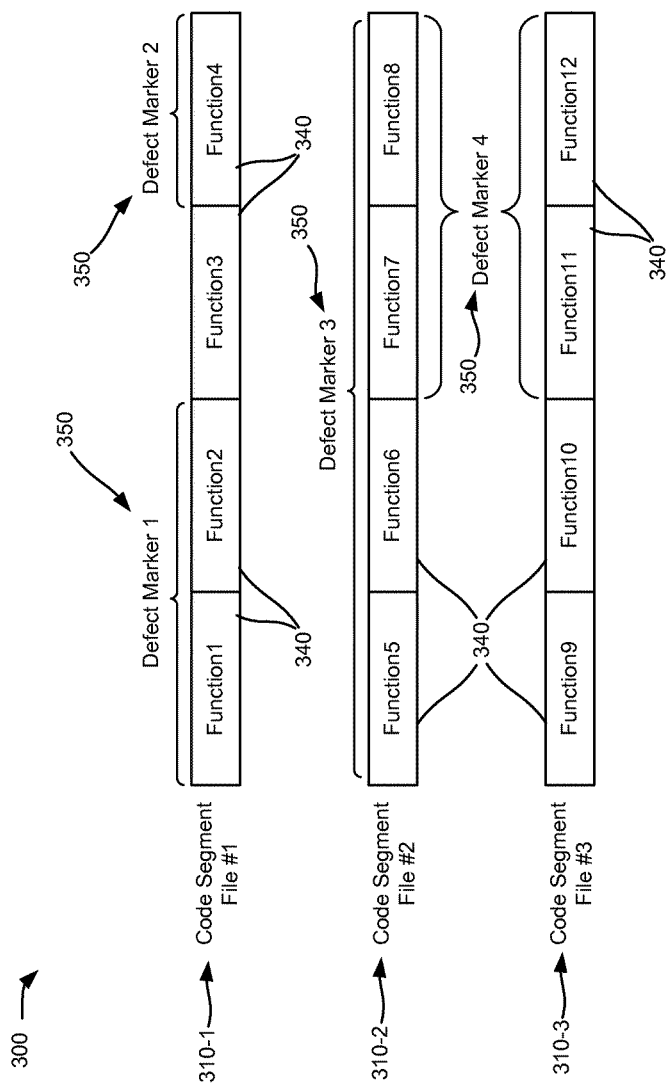
FIG. 3 is a schematic diagram illustrating a segmented application code according to an implementation described herein.

FIG. 3 is a schematic diagram illustrating a segmented application code 300 according to an implementation described herein. As opposed to traditional methods, the entire codebase for a client application is not packaged as one single file. Instead, in implementations described herein, the code is segmented into multiple logical files or objects. Each logical segment is flagged with a "defect marker" to create indexes. Thus, the code is written in such a way that it can be segmented at a function level or subroutine level, linked to related functions, and marked to create cross-verification matrix of defect markers (also referred to herein as a "dependencies matrix").

As shown in the example of FIG. 3, application code 300 may include multiple code segment files 310-1, 310-2, and 310-3 (referred to collectively as "code segment files 310" and generically as "code segment file 310"). Each code segment file 310 may include discrete logical functions 340 (e.g., "Function1," "Function2," . . . , "Function12"). Logical functions 340 may distinguish between code functions such that code defects can be isolated within a minimal number of logical functions 340. For example, one logical function 340 may relate to user interface navigation, while another logical function 340 may relate to the application launch. Logical functions 340 may be associated, or flagged, with one or more defect markers 350 (e.g., "Defect Marker 1," "Defect Marker 2," etc.). Each defect marker 350 may indicate, for example, a particular logical function 340, or group of logical functions 340, that would be impacted by a certain defect and/or defect fix.

Defect markers 350 may be added during creation of application code 300 and/or development of code fixes for application code 300. In one implementation, a defect marker 350 may be associated with a single logical function 340 (e.g., "Defect Marker 2"). In another implementation, a defect marker 350 may be associated with multiple logical functions 340 within the same code segment file 310 (e.g., "Defect Marker 1"). In still another implementation, a defect marker 350 may be associated with all logical functions 340 within a code segment file 310 (e.g., "Defect Marker 3"). In other implementations, a defect marker 350 may be associated with logical functions 340 between multiple code segment files 310 (e.g., "Defect Marker 4").

Defect markers 350 may be used to create an index to cross-reference particular defects to particular code segments. A dependencies matrix may be used to store references to link particular defects to associated logical functions 340 and defect markers 350. In one implementation, application server 130 may create a dependencies matrix and/or update a dependencies matrix each time a developer provides or uploads application code 300 and/or code segment files 310 to code segment storage 140.

FIG. 4 is a sample data structure 400 for a dependencies matrix according to an implementation described herein. Data structure 400 may be used to associate a defect in a client application with a particular code function and/or code segment file(s). As shown in FIG. 4, data structure 400 may include a defect number field 410, a defect marker field 420, a dependencies field 430, and a variety of records or entries 440 associated with fields 410-430.

Defect number field 410 may include a defect number or error code associated with a particular feature of client application software, such as segmented application code 300. In one implementation, a defect number for defect number field 410 may relate to a particular code bundle, such segmented application code 300 designed for a particular operating system.

Defect marker field 420 may associate defects from defect number field 410 with particular defect markers (e.g., defect markers 350). For example, a particular defect number may be associated with one or more codes sections by a single defect marker. In another implementation, a particular defect number may be associated with multiple defect markers.

Dependencies field 430 may associate particular logical code functions with a corresponding defect marker from defect marker field 420. In one implementation, entries 440 in dependencies field 430 may identify a particular version, date or timestamp of the logical code functions or code files containing the logical code functions. Thus, a device (e.g., customer device 100 or application server 130) may compare a version/date of a currently-installed code section with the version/date of the entry 440 in dependencies field 430 to determine if an updated code segment is available to address a particular defect.

Although FIG. 4 shows exemplary information that may be provided in data structure 400 for a dependencies matrix, in other implementations, data structure 400 may contain less, different, differently-arranged, or additional information than depicted in FIG. 4. In other implementations, data structure 400 may take the form of a spreadsheet, a database, a flat data structure, etc.

FIG. 5 is a sample data structure 500 for an incident log according to an implementation described herein. Data structure 500 may be used to track segment downloads to determine if a global fix is necessary for a particular client application. As shown in FIG. 5, data structure 500 may include a defect number field 510, a segment download field 520, an incident count field 530, an incident threshold field 540, and a variety of records or entries 550 associated with fields 510-540.

Defect number field 510 may include a defect number or error code associated with a particular feature of client application software, such as segmented application code 300. Defect number field 510 may correspond, for example, to defect number field 410.

Segment download field 520 may include a particular code file or function identifier corresponding to a record in defect number field 510. In one implementation, records in segment download field 520 may correspond to records in dependencies field 430. In another implementation, segment download field may identify particular code segment files without indicating functions.

Incident count field 530 may provide an ongoing count of file downloads for a corresponding code segment file from segment download field 520. Records in incident count field 530 may be updated, for example, with each download requested by customer device 110.

Incident threshold field 540 may provide a threshold value of file downloads for a corresponding code segment file from segment download field 520. Values in incident threshold field 540 may correspond to, for example, a percentage of the total number of customer devices with a client application (e.g., segmented application code 300) installed. In one implementation, the threshold value in incident threshold field 540 may include a maximum number of downloads for a particular file type that is needed before a rollout to all devices using a particular segmented application code 300. For example, if the total number of customer devices with a client application is 256,210, an incent threshold of 50% may be selected (e.g., by a network administrator for service provider network 120) for a particular defect number and a corresponding value of 128,105 calculated for the corresponding value in incident threshold field 540.

Incident threshold field 540 may use different values based on a type of defect (in corresponding defect number field 510) or functional type of file segment (from corresponding segment download field 520). For example, a value in incident threshold field 540 may be set at a relatively low value for a defect with significant user impact and/or a high likelihood that most users would experience that defect (e.g., launch-related defects). Conversely, a value in incident threshold field 540 may be set at a relatively high value for a defect with minimal user impact or a low likelihood that most users would experience that defect (e.g., user navigation within a particular menu or feature).

Although FIG. 5 shows exemplary information that may be provided in data structure 500 for a dependencies matrix, in other implementations, data structure 500 may contain less, different, differently-arranged, or additional information than depicted in FIG. 5. For example, in another implementation, data structure 500 may not include one of defect number field 510 or segment download field 520.

Figure 6:
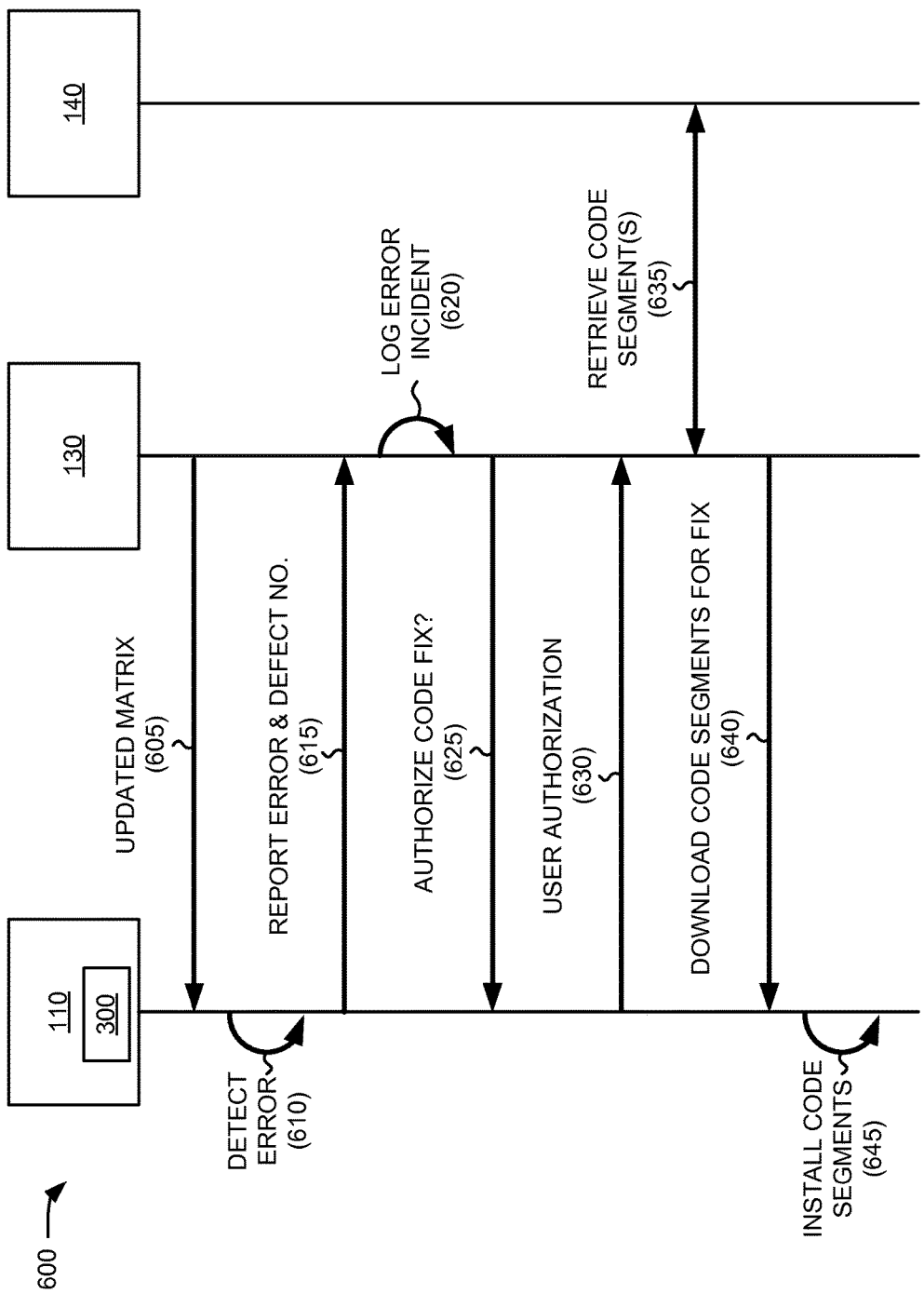
FIG. 6 is a block diagram illustrating exemplary communications between devices in a portion of the network of FIG. 1.

FIG. 6 is diagram of exemplary communications for a portion 600 of network 100. Communications in FIG. 6 may represent communications to provide dynamic delivery of code and defect fixes to client applications on customer devices 110. More particularly, the communication of FIG. 6 may enable customer devices 110 to detect when software upgrades are necessary/available for a client application residing on customer device 110 and dynamically download corrective code segments. As shown in FIG. 6, network portion 600 may include customer device 110, application server 130, and code segment storage 140. Customer device 110, application server 130, and code segment storage 140 may include functionality described above in connection with, for example, FIGS. 1-5.

Referring to FIG. 6, segmented application code 300 may be installed or otherwise stored on customer device 110. Segmented application code 300 may be obtained, for example, via a download procedure from application server 130 or another device in service provider network 120 (not shown). As noted above in connection with FIG. 3, segmented application code 300 may include multiple code segment files 310. Application server 130 may provide an updated matrix 605 to customer device 110. Updated matrix 605 may be provided, for example, on a periodic basis (e.g., daily) as part of a system startup. Updated matrix 605 may associate a defect code in a client application with a particular code function and/or code segment file(s). In one implementation, updated matrix 605 may correspond to data structure 400 described above.

At some point in time after receiving updated matrix 605, customer device 110 may detect an error 610 with segmented application code 300. For example, segmented application code 300 may encounter an error during use of the client application by a user. The error may include a defect number associated with the particular code section of segmented application code 300. In response to detecting the error, customer device 110 may perform a lookup in updated matrix 605 to associating the defect number for the error with a corresponding defect marker and/or dependency. Customer device 110 may report 615 the error and corresponding defect number to application server 130. In one implementation, report 615 may also include a corresponding defect marker and/or dependency as obtained from updated matrix 605. In another implementation, report 615 may also include a version number of the corresponding code segment file currently installed on customer device 110.

Application server 130 may receive report 615 and may log the error incident using, for example, data structure 500, as indicated by reference 620. Depending on the information in report 615, application server 130 may perform a lookup in data structure 400 to identify a particular file of segmented application code 300 that is available to resolve the error indicated in error report 615. Application server 130 checks the dependencies matrix on whether there is fix available for the issue or not. This is context sensitive based on type of the issue, device model, software fix or hardware fix, etc.

According to implementations described herein, either of customer device 110 (e.g., at step 610) or application server 130 (at step 620) may compare a version number of the code segment file currently installed on customer device 110 with a version number of the updated code segment file to determine if customer device 110 is eligible to receive the updated code segment file. For example, if the version number of the code segment file currently installed on customer device 110 is lower than the version number in the updated code segment file, customer device 110 or application server 130 may determine that the client application should be upgraded.

Assuming a code fix (e.g., one of code segment files 310) is available, application server 130 may send an authorization request 625 to customer device 110 to confirm that the user of customer device 110 wants to download the corrective code segment file 310 at that time. Customer device 110 may obtain the user authorization and forward the user authorization 630 to application server 130. In response to user authorization 630, application server 130 may retrieve, from code storage 140, the particular code segment file 310 of segmented application code 300 that is available to resolve the error indicated in error report 615, as indicated in reference 635. As shown in reference 640, application server 130 may provide the code segment to customer device 110 for downloading. Alternatively, in some embodiments, the corrective code segment file 310 may be automatically downloaded by or pushed out to customer device 110.

Customer device 110 may receive the particular file of segmented application code 300 via download 640 and install the corrected code segment file (e.g., code segment file 310) on customer device 110. In one implementation, customer device 110 may prompt the user to restart the application or customer device 110 to activate the change.

Although FIG. 6 shows exemplary components of network portion 600, in other implementations, network portion 600 may include fewer components, different components, differently-arranged components, and/or additional components than depicted in FIG. 6. Alternatively, or additionally, one or more components of network portion 600 may perform one or more other tasks described as being performed by one or more other components of network portion 600.

Figure 7A:
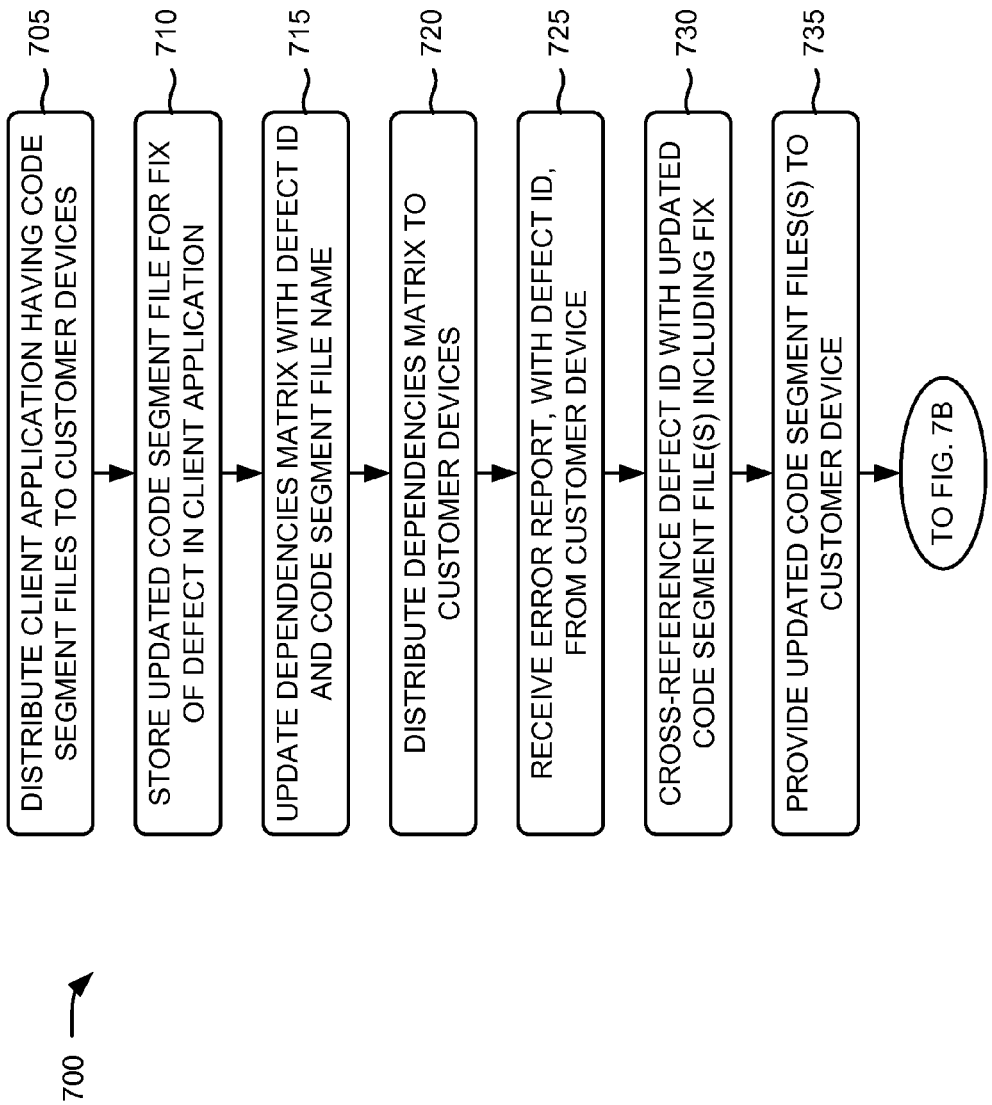
FIGS. 7A and 7B are flow diagrams of an exemplary process for performing dynamic delivery of application code fixes to a customer device, according to an implementation described herein.
Figure 7B:
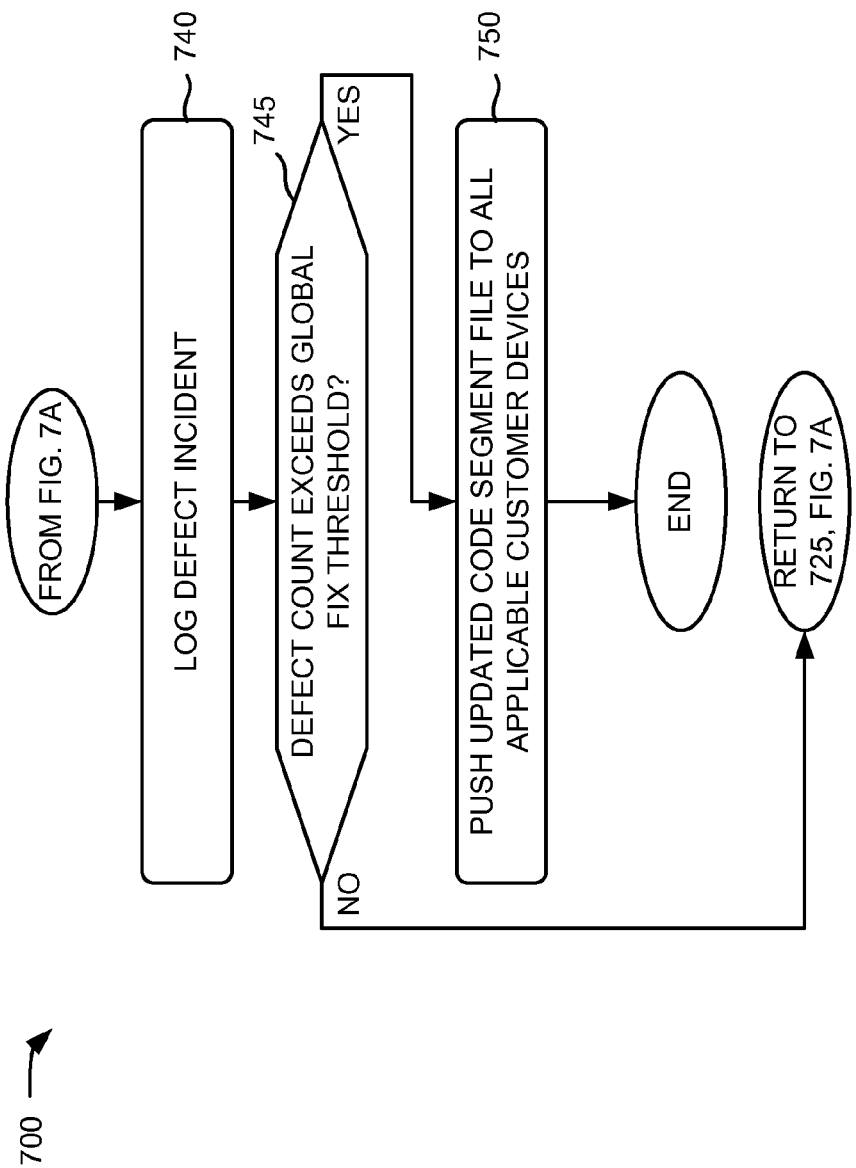

FIGS. 7A and 7B provides a flow diagram of an exemplary process 700 for providing dynamic delivery of code and defect fixes to client applications on customer devices. In one implementation, process 700 may be performed by application server 130. In another implementation, some or all of process 700 may be performed by another device or group of devices, including or excluding application server 130. For example, application server 130 may perform one or more parts of process 700 in conjunction with code storage 140, other devices (not shown) in service provider network 120, and/or customer devices 110.

As shown in FIG. 7A, process 700 may include distributing a client application that has code segment files to multiple customer devices (block 705). For example, application server 130 may distribute, to multiple customer devices 110, a client application (e.g., segmented application code 300) that includes multiple modular code segment files (e.g., code segment files 310).

Process 700 may include storing an updated code segment file that includes a fix for a code defect in a client application (block 710), and updating a dependencies matrix with a defect identifier and code segment file name (block 715). For example, when a code defect is detected in segmented application code 300 a programming team may develop a coding fix and create an updated code segment file 310 to fix the code defect. The updated code segment file 310 may be a modular replacement for the previous code segment file 310 that included the defect. Thus, the updated code segment file 310 may be used to replace previous code segment file 310, that included the defect, in customer devices 110 without replacing other code segment files 310 for segmented application code 300. The updated code segment file 310 may be indexed to particular functions (e.g., logical functions 340) and defects (e.g., defect markers 350). The updated code segment file 310 may be stored, for example, in code storage 140 and made accessible to application server 130. Application server 130 may use the index information to update a dependencies matrix (e.g., data structure 400) for the client application.

Process 700 may also include distributing the dependencies matrix to customer devices (block 720) and receiving an error report, with a defect identifier, from one of the customer devices (block 725). For example, application server 130 may send all, or relevant portions, of the dependencies matrix to customer devices 110. In one implementation, the dependencies matrix may be provided as part of a device start-up or application start-up routine. When a particular customer device 110 encounters an error with the client application, customer device 110 may generate an error report, based on the dependencies matrix, that includes a particular defect identifier. In one implementation, customer device 110 may use the dependencies matrix to determine if an updated code segment file is available before providing the error report. Application server 130 may receive the error report from customer device 110.

Process 700 may further include cross-referencing the defect identifier with one or more updated code segment files including a fix for the defect indicated by the defect identifier (block 730), and providing the one or more updated code segment files to the customer device (block 735). For example, application server 130 may determine, based on the dependencies matrix, that an updated code segment file is available to correct the error corresponding to the particular defect identifier in the error report. Application server 130 may retrieve the updated code segment file from code segment storage 140 and may send the updated code segment file to the particular customer device 110. In one implementation, application server 130 may first request user authorization before sending the updated code segment file. Customer device 110 may then install the updated code segment file to dynamically resolve the code defect.

Referring to FIG. 7B, process 700 may additionally include logging a defect incident (block 740), and determining if a defect count exceeds a global fix threshold (block 745). For example, application server 130 may log receipt of the particular defect identifier to update an incident count for the particular defect identifier (e.g., in data structure 500). Application server 130 may compare the incident count to an incident threshold for the particular defect identifier to determine if the updated code segment should be pushed as a global fix to all customer devices 110 with the client application.

If the defect count exceeds the global fix threshold (block 745—YES), process 700 may include pushing the updated code segment file to all applicable customer devices (block 750). For example, application server 130 may send the updated code segment file to all customer devices 110 that have the client application. In one implementation, the updated code segment file may be distributed to all the customer devices 110 as part of a device start-up or application start-up routine. Customer devices 110 that have not already received the updated code segment file may then install the updated code segment file to proactively resolve the code defect.

If the defect count does not exceeds the global fix threshold (block 745—NO), process 700 may return to block 725 to receive additional error reports. For example, application server 130 may continue to receive error reports for individual code defects and dynamically provide updated code segment files to resolve defects on individual customer devices 110. Thus, code updates can be targeted to customers that actually use various features without consuming network resources to provide unnecessary code updates.

According to implementations described herein, updated code segment files may be provided to specific customer devices to correct code defects encountered by the particular customer device. These techniques can be applied at device driver layer, device platform layer, and/or user interface layer. The type of fix that is applied can be specifically directed to each customer, as every customer will not run into same issues due to variations in user habits, platforms, device configuration settings, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7A and 7B, the order of the blocks may be modified in other implementations. Further, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

The word "exemplary" is used herein to mean "serving as an example." Any embodiment or implementation described as "exemplary" is not necessarily to be construed as preferred or advantageous over other embodiments or implementations.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    distributing, to multiple user devices, a client application that includes multiple modular code segment files, wherein each code segment file includes multiple discrete logical functions;
    obtaining, by a network device, updated code segment files and a dependencies matrix for the client application, wherein the updated code segment files include defect identifiers, and wherein the dependencies matrix associates known defects in the client application with the updated code segment files using the defect identifiers;
    distributing to the multiple user devices, by the network device and in response to the obtaining, a defect matrix, wherein the defect matrix includes the defect identifiers corresponding to different combinations of discrete logical functions affected by each of the known defects;
    receiving, by the network device, an error report from one of the multiple user devices, the error report including a particular defect identifier from the defect matrix;
    determining, by the network device and based on the dependencies matrix, that a particular combination of updated code segment files of the updated code segment files is available to correct an error indicated by the particular defect identifier;
    retrieving, by the network device and from a code segment storage location, the particular combination of updated code segment files, wherein the particular combination of updated code segment files are configured to be installed on a user device to resolve the error indicated by the particular defect identifier;
    sending, by the network device, the particular combination of updated code segment files to the one of the multiple user devices;
    logging, by the network device and based on the sending, the particular defect identifier to update an incident count for the particular defect identifier, wherein the incident count tracks a number of downloads of the particular combination of updated code segment files;
    comparing, by the network device, the incident count to an incident threshold for the particular defect identifier, wherein the incident threshold for the particular defect identifier indicates a portion of a total number of devices with the client application, and wherein the incident threshold for the particular defect identifier is different than another incident threshold for a different defect identifier for the client application; and
    pushing, to the multiple user devices, the particular combination of updated code segment files when the incident count exceeds the incident threshold for the particular defect identifier.

2. The method of claim 1, wherein the incident threshold for the particular defect identifier represents a percentage of the number of the multiple user devices.

3. The method of claim 1,
    wherein the error report further includes a particular code segment file name associated with the particular defect identifier.

4. The method of claim 1, wherein the error report indicates code segments for the client application that relate to a particular operating system.

5. The method of claim 1, further comprising:
    requesting, by the network device and based on the determining, user authorization to download the updated code segment file to the one of the multiple user devices; and
    receiving, by the network device, the user authorization.

6. The method of claim 5, wherein the user authorization determined at least in part based on the incident threshold for the particular defect identifier represents a percentage of the number of the multiple user devices.

7. The method of claim 5, wherein the user authorization determined at least in part based on the error report further includes a particular code segment file name associated with the particular defect identifier.

8. The method of claim 5, wherein the user authorization determined at least in part based on the error report indicates code segments for the client application that relate to a particular operating system.

9. The method of claim 1, further comprising:
    receiving, by the one of the multiple user devices, the updated code segment file; and replacing, by the one of the multiple user devices, a particular code segment file, associated with the particular defect identifier, with the updated code segment file.

10. The method of claim 1, further comprising:
restarting, by the one of the multiple user devices, the client application with the updated code segment file.

11. A device, comprising:
a network interface to communicate with one or more remote systems;
one or more memories to store instructions; and
one or more processors configured to execute instructions in the one or more memories to:
   distribute, to multiple user devices, a client application that includes multiple modular code segment files, wherein each code segment file includes multiple discrete logical functions;
   receive updated code segment files and dependency information for the client application, wherein the updated code segment files include defect identifiers, and wherein the dependency information associates known defects in the client application with the updated code segment files using the defect identifiers;
   distribute to the multiple user devices, in response to the obtaining, a defect matrix, wherein the defect matrix includes the defect identifiers corresponding to different combinations of discrete logical functions affected by each of the known defects;
   receive an error report from one of the multiple user devices, the error report including a particular defect identifier from the defect matrix;
   determine, based on the dependency information, that a particular combination of updated code segment files of the updated code segment files is available to correct an error indicated by the particular defect identifier;
   retrieve, from a code segment storage location, the particular combination of updated code segment files, wherein the particular combination of updated code segment files are configured to be installed on a user device to resolve the error indicated by the particular defect identifier;
   send the particular combination of updated code segment files to the one of the multiple user devices;
   log, based on the sending, the particular defect identifier to update an incident count for the particular defect identifier, wherein the incident count tracks a number of downloads of the particular combination of updated code segment files;
   compare the incident count to an incident threshold for the particular defect identifier, wherein the incident threshold for the particular defect identifier indicates a portion of a total number of devices with the client application, and wherein the incident threshold for the particular defect identifier is different than another incident threshold for a different defect identifier for the client application; and
   push, to the multiple user devices, the particular combination of updated code segment files when the incident count exceeds the incident threshold for the particular defect identifier.

12. The device of claim 11, wherein the incident threshold for the particular defect identifier represents a percentage of the number of the multiple user devices.

13. The device of claim 11, wherein the error report further includes a particular code segment file name associated with the particular defect identifier.

14. The device of claim 11, wherein the error report indicates code file segments for the client application that relate to a particular operating system.

15. The device of claim 11, wherein
the one or more processors are further configured to execute instructions in the one or more memories to:
   request, based on the determining, user authorization to download the particular combination of updated code segment files to the one of the multiple user devices; and
   receive the user authorization.

16. A non-transitory computer-readable medium including instructions, to be executed by a processor, for causing the processor to:
   distribute, to multiple user devices, a client application that includes multiple modular code segment files, wherein each code segment file includes multiple discrete logical functions;
   receive updated code segment files for the client application, wherein the updated code segment files include defect identifiers, and wherein a dependencies matrix associates known defects in the client application with the updated code segment files using the defect identifiers;
   distribute to the multiple user devices, in response to the obtaining, a defect matrix, wherein the defect matrix includes the defect identifiers corresponding to different combinations of discrete logical functions affected by each of the known defects;
   receive an error report from one of the multiple user devices, the error report including a particular defect identifier from the defect matrix;
   determine, based on the dependencies matrix, that a particular combination of updated code segment files of the updated code segment files is available to correct an error indicated by the particular defect identifier;
   retrieve, from a code segment storage location, the particular combination of updated code segment files, wherein the particular combination of updated code segment files are configured to be installed on a user device to resolve the error indicated by the particular defect identifier;
   send the particular combination of updated code segment files to the one of the multiple user devices;
   logging, by the network device and based on the sending, the particular defect identifier to update an incident count for the particular defect identifier, wherein the incident count tracks a number of downloads of the particular combination of updated code segment files;
   comparing, by the network device, the incident count to an incident threshold for the particular defect identifier, wherein the incident threshold for the particular defect identifier indicates a portion of a total number of devices with the client application, and wherein the incident threshold for the particular defect identifier is different than another incident threshold for a different defect identifier for the client application; and
   pushing, to the multiple user devices, the particular combination of updated code segment files when the incident count exceeds the incident threshold for the particular defect identifier.

17. The non-transitory computer-readable medium of claim 16, further comprising instructions for causing the processor to:
  request, based on the determining, user authorization to download the particular combination of updated code segment files to the one of the multiple user devices; and
  receive the user authorization.

18. The non-transitory computer-readable medium of claim 16, wherein the incident threshold for the particular defect identifier represents a percentage of the number of the multiple user devices.

19. The non-transitory computer-readable medium of claim 16, wherein the error report further includes a particular code segment file name associated with the particular defect identifier.

20. The non-transitory computer-readable medium of claim 16, wherein the error report indicates code segments for the client application that relate to a particular operating system.

* * * * *